United States Patent
Naarmann et al.

[15] 3,697,575
[45] Oct. 10, 1972

[54] BORIC ACID ESTERS OF 2-VINYLTHIOETHANOL

[72] Inventors: Herbert Naarmann, Ludwigshafen; Heinrich Hartmann, Limburgerhof, both of Germany

[73] Assignee: Badische Anilin- & Soda-Fabrik Aktiengesellschaft, Ludwigshafen/Rhine, Germany

[22] Filed: Dec. 22, 1969

[21] Appl. No.: 887,345

[52] U.S. Cl. .........260/462 R, 260/45.7 R, 260/79.7, 260/837 R, 260/844, 260/851, 260/856, 260/870, 260/875, 260/878, 260/884, 260/DIG. 24
[51] Int. Cl. .............................................C07f 5/04
[58] Field of Search ................................260/462 R

[56] References Cited

UNITED STATES PATENTS

| | | |
|---|---|---|
| 3,303,130 | 2/1967 | Scypinski et al. ......260/462 R |
| 3,030,406 | 4/1962 | Washburn et al......260/462 R |
| 3,324,146 | 6/1967 | Murih et al. ..........260/462 R |

*Primary Examiner*—Leon Zitver
*Assistant Examiner*—L. B. De Crescente
*Attorney*—Johnston, Root, O'Keeffe, Keil, Thompson & Shurtleff

[57] ABSTRACT

Boric esters of the formula

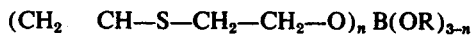

$$(CH_2{=}CH{-}S{-}CH_2{-}CH_2{-}O)_n B(OR)_{3-n}$$

where R represents an alkyl radical, optionally substituted, and $n$ is equal to 1, 2 or 3. The products are used as flameproofing agents for plastics materials and resins.

2 Claims, No Drawings

BORIC ACID ESTERS OF 2-VINYLTHIOETHANOL

The production of boric esters from boric acid, boric anhydride or boric halides and substituted or unsubstituted aliphatic, cycloaliphatic and aromatic alcohols is already known ("Organoboron Chemistry," Vol. I, H. Steinberg, John Wiley and Sons Inc., New York, London, Sidney, pp. 27 et seq. and pp. 155 et seq.).

Furthermore, the use of inorganic boron compounds such as boric acid, borax and trihaloborates or organic boron compounds such as sodium hexylolglycol monoborate, borocyclo-octanes or trialkoxy boroxine for flame-proofing cellulosic materials such as paper, wood and cotton fabrics or plastics materials and resins such as polyvinyl acetate, polyisocyanates, polyesters, epoxy, melamine and phenolic resins is also known (A. Vogel, "Flammfestmachen von Kunststoffen," Dr. A. Huttig Verlag, Heidelberg, 1966.

Some of these compounds suffer from the disadvantage that they give off aggressive acids such as hydrogen chloride when heated or in contact with moisture or that they are only effective in relatively large quantities and thus have an adverse effect on the mechanical properties of the plastics materials.

It is an object of the present invention to provide boron-containing flame-proofing agents which are effective in substantially smaller quantities and are copolymerizable with the usual monomers used in the production of plastics.

We have found that these advantageous properties are exhibited by boric esters of the formula

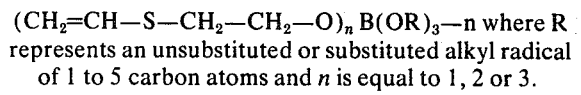

$(CH_2=CH-S-CH_2-CH_2-O)_n B(OR)_{3-n}$ where R represents an unsubstituted or substituted alkyl radical of 1 to 5 carbon atoms and $n$ is equal to 1, 2 or 3.

The said compounds are boric esters of vinylthioethanol, that is, vinylthio-ethyl dialkylborate, bis(vinylthio-ethyl) alkylborate and particularly tris(vinylthio-ethyl) borate. Suitable unsubstituted or substituted alkyl radicals are, for example, the methyl, ethyl, propyl, isopropyl, amyl, 2,3-dibromopropyl and 2-mercapto-ethyl groups.

The new boric esters are obtained by the methods generally used for the production of boric esters, that is, for example, by reacting vinylthio-ethanol and optionally other alcohols with boric acid or boric anhydride, preferably in the presence of acid catalysts such as sulfuric or hydrochloric acid, or by carrying out trans-esterification reactions involving a trialkylborate and vinylthio-ethanol.

The new compounds are extremely valuable as flame-proofing agents for plastics materials such as polystyrene, polyethylene, polyvinyl chloride, polyurethanes and preferably polyesters and resins such as epoxy, melamine, urea and phenolic resins. The new boric esters are used in quantities such that the plastics or synthetic resins contain from 0.1 to 2 percent by weight and preferably from 0.1 to 1 percent by weight of boron calculated on the total weight of polymer.

The new boric esters are copolymerizable with the monomers normally used in the production of plastics materials. Where they contain more than one C=C bond, they will additionally be suitable as cross-linking components. This makes it possible to anchor the flame-proofing agent in the structure of the plastics material, and consequently, the exudation of the additive frequently observed when other flame-proofing agents are used, is avoided. The new materials are thus of excellent value as additives in the production of polyester molding compositions.

In the following Examples the parts are by weight. The flame resistance test was carried out according to a standard method in which a draught-guarded Bunsen burner flame, 6 cm long, is directed toward a polyester-laminated wooden board, the polyester layer being 4 cm from the tip of the flame and at an angle of 80° thereto.

According to the similar A.S.T.M. standard D 635–65 T a period of 30 seconds meets the requirements of a non-burning, self-extinguishing polyester.

EXAMPLE 1 to 9

A standard polyester was esterified by the esterification of 1 part of phthalic acid, 2 parts of maleic acid and 3 parts of propylene glycol at 180° C until an acid number of 50 was obtained. Dilution was then carried out with styrene until the proportion of polyester was 66 percent by weight and the acid number was 30.

Curing was effected by a. adding 0.4 percent by weight of cyclohexanone peroxide and 0.04 percent by weight of cobalt naphthenate and heating for 20 minutes at 110° C, or by b. adding 0.5 percent by weight of benzoin methyl ether and heating for 5 minutes at 100° C in ultraviolet light (black lamp).

In each case, the percentages are calculated on the total weight of polyester. This standard mixture is modified by various additions of the compounds of the invention, as set out and compared in Table 1 below. The time to ignition is the time taken for the improved wood, that is, the polyester coating to commence burning after application of the flame.

The letters "L" and "P" in the Table indicate that the polyester was subjected to curing by light and peroxide respectively.

TABLE 1

| Example | Additive | Percent boron | Time to ignition in seconds, ASTM D 635–65 T | Burning time in seconds [1] | Remarks |
|---|---|---|---|---|---|
| 1a | None | | 8–10 | >50 | P |
| 1b | None | | 8–10 | >50 | L |
| 2a | Standard mix plus 1.8% boric acid | 0.3 | 15–20 | ~20 | L [2] |
| 2b | Standard mix plus 3.6% boric acid | 0.6 | 10–18 | ~20 | L |
| 3a | Standard mix plus 1.8% tris (dichloroethyl) phosphate | | 8–10 | ~25 | L [3] |
| 3b | Standard mix plus 3.6% tris(dichloroethyl) phosphate | | 8–10 | ~20 | L |
| 4 | Standard mix plus 3% $(CH_2=CH-S-CH_2-CH_2O)_3B$ | 0.1 | 18 | 10 | L |
| 5 | Standard mix plus 5% $(CH_2=CH-S-CH_2-CH_2O)_3B$ | 0.15 | 30–34 | 8 | L |
| 6 | Standard mix plus 10% $(CH_2=CH-S-CH_2-CH_2O)_3B$ | 0.3 | 33–38 | 5 | L |
| 7 | Standard mix plus 15% $(CH_2=CH-S-CH_2-CH_2O)_3B$ | 0.45 | 32–42 | 3–5 | L |
| 8 | Standard mix plus 5% $(CH_2=CH-COO-CH_2-CH_2O)_3B$ | 0.15 | 42 | 5 | L |
| 9 | Standard mix plus 10% $(CH_2=CH-COO-CH_2-CH_2-O)_3B$ | 0.3 | 54 | 3–5 | L |

[1] The burning time is the mean period for which 5 samples continued to burn after ignition.
[2] Added boric acid unevenly distributed; cloudy varnish.
[3] Cf. French Pat. No. 1,437,408.

EXAMPLE 10

62 parts of boric acid is mixed with 228 parts of vinylthio-ethanol and 78 parts of 2-mercapto-ethanol, and 500 parts of toluene is added. The mixture is then refluxed for three and a half hours, during which time 54 parts of water is removed. The product is fractionally distilled. The product boils at 121° to 125° C/0.05 mm. Found: B 3.6 percent, S 30 percent, SH 10.7 percent. $(CH_2=CH-S-CH_2-CH_2-O)_2B-O-CH_2-CH_2-SH$ requires B 3.62 percent, S 30.6 percent, SH 10.5 percent. If Example 2a is repeated substituting 1.8 percent of the above boric ester for the 1.8 percent of boric acid, ignition does not occur for 20 to 25 seconds and the burning time is only 15 seconds. Using 3.6 percent of the above boric ester the time to ignition is 25 to 28 seconds and the burning time approximately 12 to 15 seconds. These results show that the boric ester is superior to pure boric acid and other known additives (cf. Examples 3a and 3b) in flameproofing properties as indicated by longer ignition times and shorter burning times.

By repeating Example 10 but using the starting materials and reaction conditions indicated in Table 2 there are obtained the new boric esters listed in the second column of Table 2.

TABLE 2.—NEW BORIC ESTERS

| No. | Ester | Parts by weight Boric acid | Parts by weight Vinyl-thio-ethanol | Alcohol/parts | Reaction time (hrs.) | B.P., °C/mm. | $n_D^{20}$ | Analysis C | Analysis H | Analysis O | Analysis S | Analysis B | Analysis Br |
|---|---|---|---|---|---|---|---|---|---|---|---|---|---|
| 2 | $(CH_2=CH-S-CH_2-CH_2-O)_3B$ | 61.8 | 312 | | 3 | 170–175/0.1 | 1.6125 | 45.3 (45.1) | 6.2 (6.53) | 15.4 (15.0) | 30.2 (30.0) | 3.1 (3.37) | |
| 3 | $(CH_2=CH-S-CH_2-CH_2-O)_2BOCH_2C_3H_7$ | 61.8 | 208 | n-Propanola, 60 | 3 | 162–166/0.1 | 1.6086 | 40.9 (40.8) | 6.6 (6.47) | 16.5 (16.35) | 32.6 (32.7) | 3.5 (3.68) | |
| 4 | $(CH_2=CH-S-CH_2-CH_2-O)_2BOCH_3$ | 61.8 | 208 | Methanol, 32 | 3 | 156–159/0.1 | 1.6052 | 47.7 (48.0) | 7.5 (7.6) | 17.4 (17.1) | 23.2 (23.4) | 3.7 (3.9) | |
| 5 | $(CH_2=CH-S-CH_2-CH_2-O)_2BOCH_3$ | 61.8 | 208 | | 3.5 | 125–132/0.1 | 1.5982 | 43.3 (43.7) | 6.7 (6.8) | | 25.4 (25.82) | 4.1 (4.37) | |
| 6 | $(CH_2=CH-S-CH_2-CH_2-O)_2BOCH_2-CH=CH_2$ | 61.8 | 208 | Allyl alcohol, 58 | 3.5 | 147–151/0.1 | 1.6071 | 48.5 (48.2) | 6.3 (6.8) | | 22.9 (23.2) | 3.2 (3.5) | |
| 7 | $(CH_2=CH-S-CH_2-CH_2-O)_2BOCH_2-CH-CH_2$ Br  Br | 61.8 | 208 | 2,3-dibromopropanol, 217.8 | 3.5 | 190–195/0.1 | 1.6141 | 30.1 (30.42) | 4.5 (4.53) | 14.3 (14.67) | | 2.1 (2.52) | 36.2 (36.8) |
| 8 | $(CH_2=CH-S-CH_2-CH_2-O)_2BOC_5H_{11}$ | 61.8 | 208 | Amyl alcohol, 88 | 3.5 | 174–180/0.1 | 1.6060 | 51.0 (51.5) | 8.2 (8.1) | 20.7 (21.1) | | 3.1 (3.5) | |
| 9 | $(CH_2=CH-S-CH_2-CH_2-O)_2BOC_3H_7$ | 61.8 | 208 | Iso-propanol, 60 | 3.5 | 150–153/0.1 | 1.6044 | 47.4 (47.9) | 6.7 (7.1) | 23.0 (23.3) | | 3.4 (3.9) | |
| 10 | $CH_2=CH-S-CH_2CH_2OB(OCH_2CH-CH_2Br)_2$ Br | 61.8 | 104 | 2,3-dibromopropanol, 435.6 | 3.5 | ¹190/0.1 | 1.6173 | 21.6 (22.0) | 3.0 (3.1) | 5.2 (5.8) | | 2.1 (2.0) | 58.1 (58.4) |

¹ With decomposition.

NOTE.—The figures for the elements are percentages, the theoretic values being given in brackets.

We claim:
1. A boric ester of the formula

$$(CH_2=CH-S-CH_2-CH_2-O)_n B(OR)_{3-n}$$

where R represents an alkyl or bromo-alkyl radical containing from one to five carbon atoms or allyl and $n$ is an integer from 1 to 3.

2. A boric ester as claimed in claim 1 and having the formula $$(CH_2=CH-S-CH_2-CH_2-O)_3 B.$$

PO-1050
(5/69)

UNITED STATES PATENT OFFICE
CERTIFICATE OF CORRECTION

Patent No. 3,697,575                    Dated October 10, 1972

Inventor(s) Herbert Naarmann, Heinrich Hartmann

It is certified that error appears in the above-identified patent and that said Letters Patent are hereby corrected as shown below:

Cover Page, left hand column, insert
-- [30] Foreign Application Priority Data.
     Jan. 10, 1969   Germany.....P 19 01 058.3 --

Signed and sealed this 24th day of April 1973.

(SEAL)
Attest:

EDWARD M. FLETCHER, JR.                ROBERT GOTTSCHALK
Attesting Officer                      Commissioner of Patents